United States Patent [19]

Obermeyer

[11] Patent Number: 4,856,748
[45] Date of Patent: Aug. 15, 1989

[54] LEG ASSEMBLY FOR A KEYBOARD OR THE LIKE

[75] Inventor: Mark W. Obermeyer, Oakville, Canada

[73] Assignee: Northern Telecom Limited, Montreal, Canada

[21] Appl. No.: 256,179

[22] Filed: Oct. 6, 1988

Related U.S. Application Data

[63] Continuation of Ser. No. 88,752, Aug. 24, 1987, abandoned.

[51] Int. Cl.$^4$ .............................................. F16F 15/00
[52] U.S. Cl. ..................................... 248/688; 248/676; 248/685; 400/681
[58] Field of Search ............... 248/359, 359 E, 359 H, 248/653, 677, 455, 456, 439, 188.8, 676, ; 108/9; 400/681, 682

[56] References Cited

U.S. PATENT DOCUMENTS

| | | | |
|---|---|---|---|
| 1,598,931 | 9/1926 | Patche | 248/359 E |
| 2,388,567 | 11/1945 | Patterson | 248/359 E X |
| 3,155,362 | 11/1964 | McCall | 248/359 |
| 3,361,402 | 1/1968 | Cech | 248/188 |
| 3,787,017 | 1/1974 | Sauer | 248/359 E X |
| 3,878,964 | 4/1975 | Fogle | 248/359 E X |
| 3,920,213 | 11/1975 | Hanson | 248/455 X |
| 4,022,414 | 5/1977 | Egger | 248/150 |
| 4,054,256 | 10/1977 | Buck et al. | 248/359 E X |
| 4,113,212 | 9/1978 | Coriden . | |
| 4,141,523 | 2/1979 | Brendgens | 248/653 |
| 4,196,821 | 4/1980 | Teti, Jr. et al. | 220/94 R |
| 4,344,612 | 8/1982 | Leise et al. | 248/359 E X |
| 4,415,062 | 11/1983 | Shaw | 182/109 |
| 4,505,408 | 3/1985 | Sagol | 248/439 X |
| 4,516,508 | 5/1985 | Kako et al. | 108/7 |
| 4,557,200 | 12/1985 | Geschwender | 248/439 X |
| 4,592,528 | 6/1986 | Still | 248/359 |
| 4,658,124 | 4/1987 | Bertina | 248/677 X |
| 4,735,394 | 4/1988 | Facco | 248/188.8 |

FOREIGN PATENT DOCUMENTS 0381443 9/1923 Fed. Rep. of Germany ...... 400/681

*Primary Examiner*—Ramon O. Ramirez
*Attorney, Agent, or Firm*—Robert C. Hogeboom

[57] ABSTRACT

A leg assembly for a keyboard is described in which the leg operates, without the use of an actuating mechanism or direct hand intervention, to be movable between two stable positions; the first being a retracted position, the second being a deployed position. The leg assembly is of simple construction, comprised of a leg pivotally mounted to a keyboard or the like by means of a pin. Simplicity of use is inherent in the design.

5 Claims, 4 Drawing Sheets

LEG ASSEMBLY FOR A KEYBOARD OR THE LIKE

This is a continuation of application Ser. No. 088,752, filed on Aug. 24, 1987, now abandoned.

FIELD OF THE INVENTION

This invention relates generally to legs for keyboards. Specifically the invention relates to a retractable leg which may be depolyed without the use of an actuating mechanism.

BACKGROUND OF THE INVENTION

It is common practice, in this age of computers, to provide keyboards which have mechanisms for altering the inclination of the keyboard face to provide an operator with a more comfortable working position. These mechanisms have leg assembly for a keyboard comprising: a single leg extending substantially for the length of the keyboard; the single leg comprising an elongate base member attached to an elongate back member, and two side members attached to opposite ends of the base and back members; the elongate back member having thereon at least one nib which acts as a foot when the leg is in a retracted position and which supports a back edge of the keyboard when the leg is in a deployed position; and, means for axial pivotal mounting of the leg to the keyboard; wherein the leg is movable between two stable positions, a first position being the retracted position, the second position being the deployed position beyond a quiescent position of the leg, and further wherein the leg is moved from the retracted position to the deployed position solely by means of gravity and rotational inertia thereby causing the leg to pass from the retracted position, beyond the quiescent position and into the deployed position.

It has been common practice in the field of leg assemblies to provide an actuating mechanism to allow deployment or retraction of the leg assembly, as described in U.S. Pat. No. 4,196,821 in the name of Joseph A. Teti, Jr. et al, granted Apr. 8, 1980; aforementioned U.S. Pat. Nos. 4,592,528 and 4,527,1499 in the name of M. W. Swensen, dated July 2, 1985. It has also been common practice to design the leg assemblies such that they must be hand operated, as described in U.S. Pat. Nos. 4,516,508 in the name of M. Kako et al, granted May 14, 1985; 4,113,212 in the name of Paul Coriden, granted Sept. 12, 1978; 3,155,362 in the name of Clarence I. McCall, granted Nov. 3, 1964 and 3,361,402 in the name of K. Cech and granted Jan. 2, 1968.

SUMMARY OF THE INVENTION

The present invention is a leg assembly for a keyboard or the like in which the leg is deployed by means of gravity. In one preferred embodiment for a keyboard, the leg assembly comprises one leg extending approximately for the length of the keyboard, having a pivot for pivotally mounting the leg to the keyboard, wherein the leg is movable between two stable positions, a first being a retracted position, the second being a deployed position. It is an advantage of the present invention that relatively few parts are required to provide the function of stable support in two distinct positions. It is a further advantage of the present invention that neither an actuating mechanism is required nor is direct hand operation.

Stated in other terms, the present invention is a leg assembly for a keyboard wherein the leg assembly is deployed solely by gravity and comprising: a leg extending substantially for the length of the keyboard, the single leg comprising an elongate base member attached to an elongate back member, and two side members attached to opposite ends of said base and back members; and means for pivotally mounting the leg to the keyboard. The leg is movable between two stable positions, a first position being a retracted position wherein the keyboard has a recess to accept the leg, the second position being a deployed position wherein the leg is self-locking.

DETAILED DESCRIPTION

Figure 1:
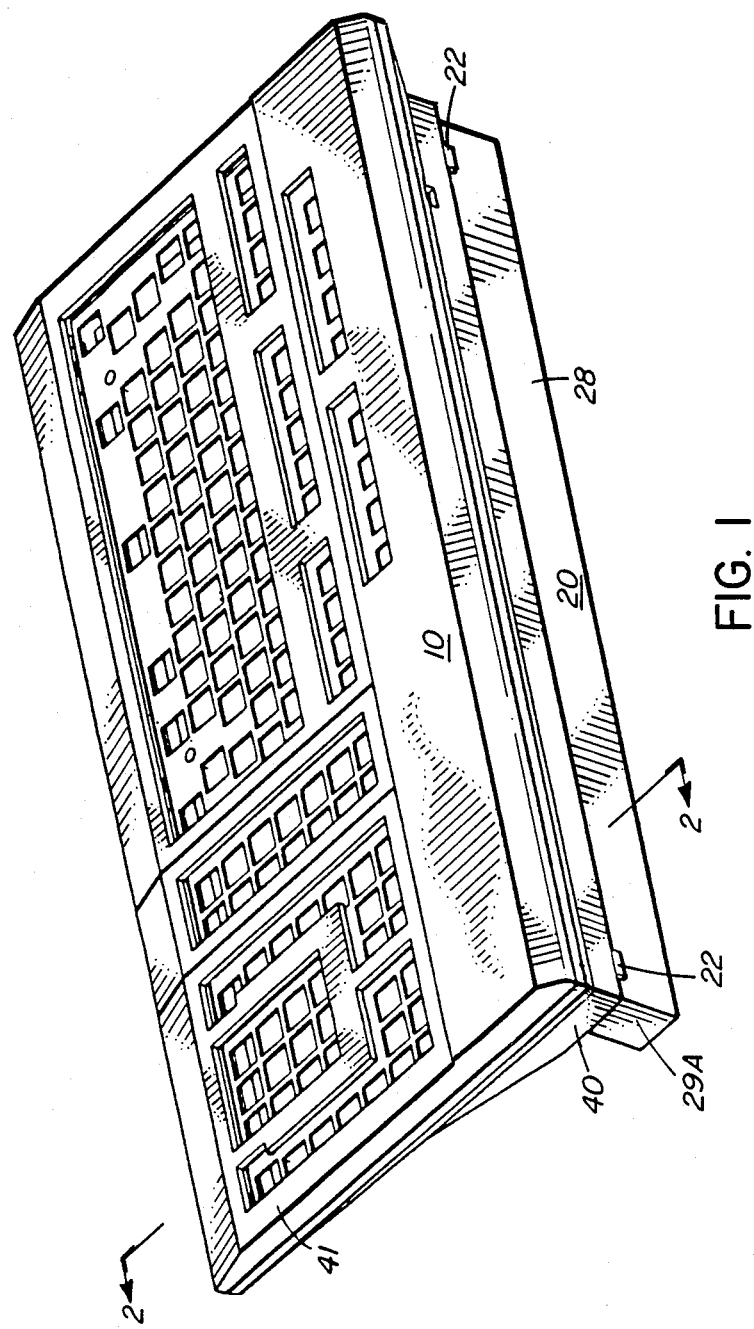
FIG. 1 depicts a simplified perspective view taken generally from the top and back of a keyboard showing the support leg in its deployed position.

FIG. 1 depicts the top of a keyboard 10, showing support leg 20 consisting of one back member 28, two side members 29 (only one of which is shown in FIG. 1), and base member 26 (shown in FIG. 2), according to a preferred embodiment of the invention.

Figure 2:
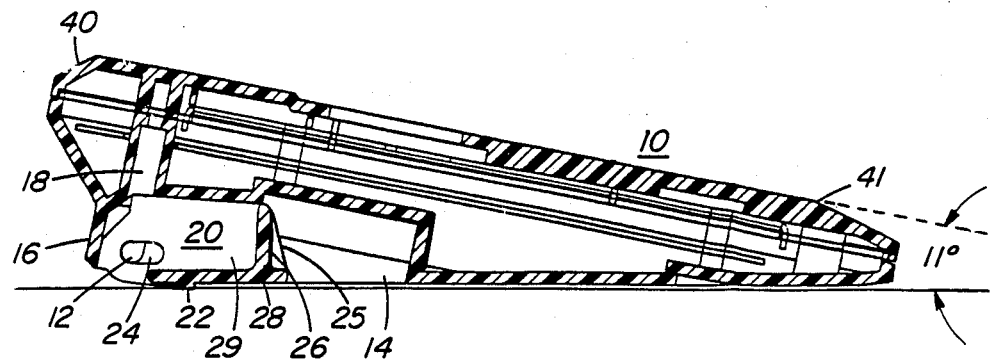
FIG. 2 is a side elevation view of the keyboard of FIG. 1, taken along the section lines 2—2, but showing the support leg in its retracted position.

FIG. 2 depicts a side elevation view of keyboard 10. Support leg 20 is shown retracted into recess 14. In this configuration, the keyboard face 41 has an 11° incline with respect to surface 30. FIG. 2 also illustrates the configuration of support leg 20. Support leg 20 consists of a rectangular back member 28 which has molded to it a rectangular base 26. Both back member 28 and base member 26 are almost as long as the length of keyboard base 16 (as depicted in FIG. 1). In FIG. 2, one of two side members 29, located at opposite ends of the back and base members, and molded thereto, is shown. Support leg 20 is constructed such that when support leg 20 is in a retracted position back member 28 with two small nibs 22 is presented to the work surface 30. The small nibs 22, in this position, act as a foot for keyboard 10. Located in side member 29A is an oblong channel 24 which is provided to allow pin 12, connected to strut 18, connected to the keyboard base 16, to project through channel 24 and act as a pivot point. A similar construction is provided for side member 29B. Note that with support leg 20 in the retracted position, pin 12 is located at the end of the oblong channel 24 farthest from the base 26 of leg 20.

Figure 3:
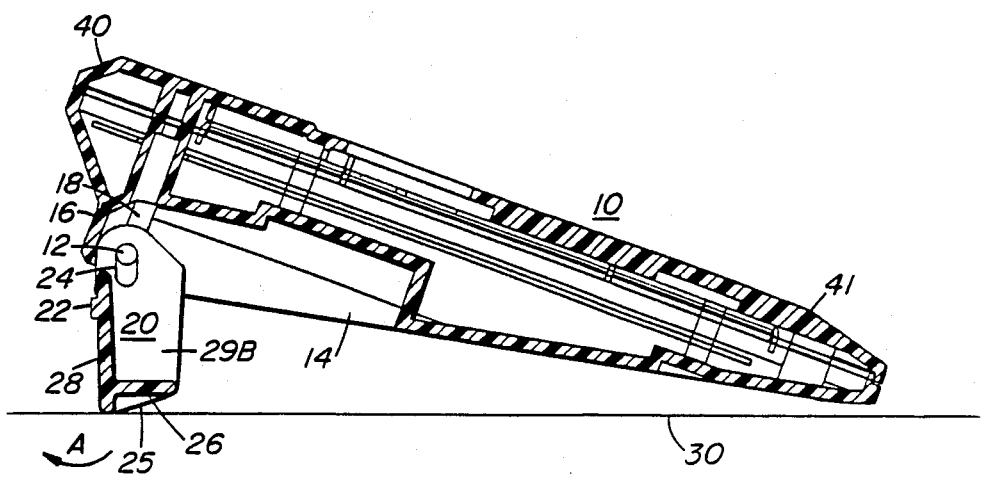
FIG. 3 is similar to FIG. 2 except that it shows the support leg in an intermediate position between deployment and retraction.
Figure 4:
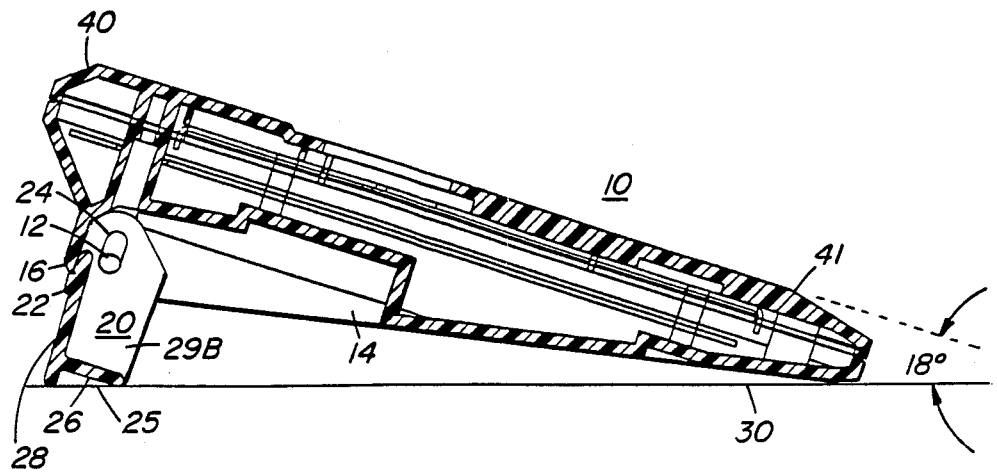
FIG. 4 is a further side elevation view of the keyboard, showing the support leg in its deployed and lock position.
Figure 6:
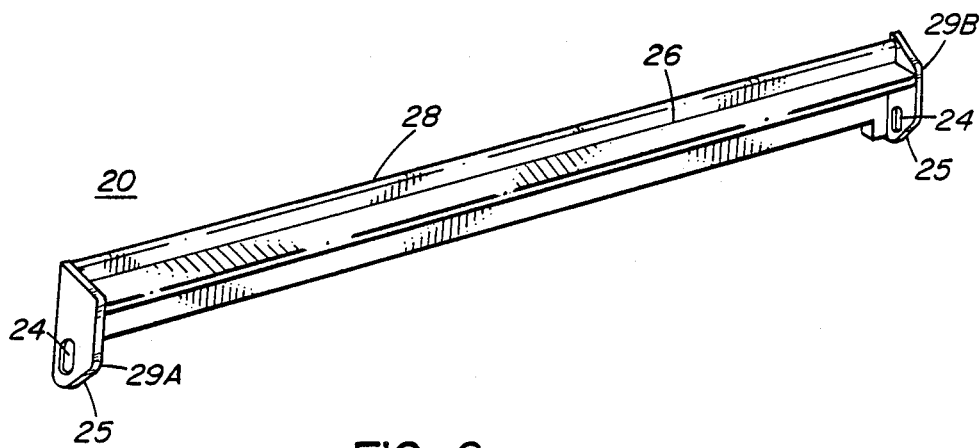
FIG. 6 is a perspective view of the leg assembly alone.
Figure 5:
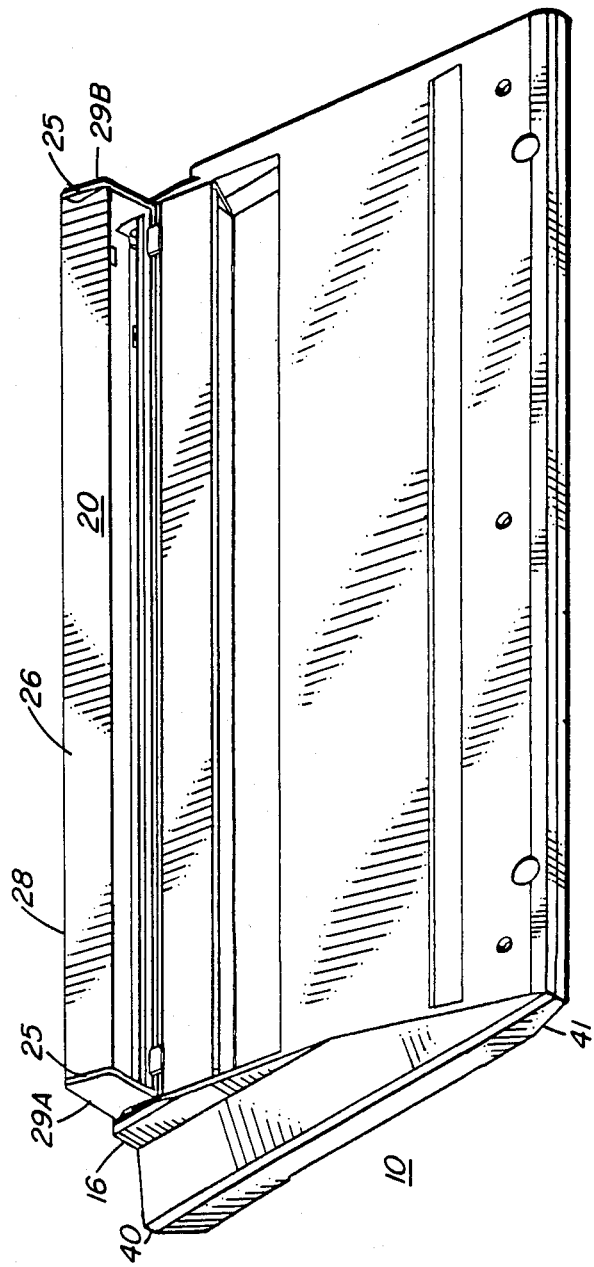
FIG. 5 is a simplified perspective view of the bottom of a keyboard showing the support leg in its deployed position.

To deploy support leg 20, the rear 40 of keyboard 10 is raised, thus allowing support leg 20 to swing, due to the weight of the leg, from its retracted position to depend (hang) from keyboard base 16, as shown in FIG. 3. Support leg 20 will pivot past point A, in the direction shown in FIG. 3, due to its rotational inertia. Keyboard 10 is then lowered causing pin 12 to slide downwards in oblong channel 24. When support leg 20 is in its deployed position, a flat edge 25 of side member 29A is presented to the work surface 30 to act as a support for the keyboard. The nibs 22 on back member 28 are used, in the deployed position, to support the back edge of the keyboard base 16. The position of pin 12, as depicted in FIG. 4, as well as the curved edge of the top of side member 29 interact with keyboard base 16 to create a reaction force to aid in locking support leg 20 in the deployed position. With support leg 20 in its deployed position, an 18° angle of inclination of the keyboard face 41 with respect to surface 30 is obtained, as may be desirable by the operator.

To replace support leg 20 into its retracted position, the rear of keyboard 10 is raised slightly to allow the pin 12 to slide upwards in oblong channel 24 while keeping the leg 20 in contact with the work surface 30. Keyboard 10 is then moved slightly away from the operator (i.e. to the left in FIGS. 3 and 4) to cause support leg 20 to pivot towards recess 14. Keyboard 10 is then lowered, forcing support leg 20 to continue to pivot around pin 12, due to the weight of the keyboard, until it is back in its retracted position and the keyboard base 16 is resting on the work surface 30 (as is depicted in FIG. 2).

In the preferred embodiment, both keyboard 10 and leg 20 are made of non-resilient plastic (e.g. ABS). Leg 20 is attached to keyboard 10 by means of metal pins attached to metal brackets (not shown).

In another embodiment, the pins may be part of the keyboard 10 or support leg 20. The corresponding part may then be made of a resilient material. For example, the pins can be made as an integral part of keyboard 10; the leg 20, having resilient side members can then be made to snap onto keyboard 10 by flexing the side members 29 to allow the pins to be inserted into the oblong channels.

It can be noted that an actuating mechanism to deploy or retract the leg 20 is not needed. Nor is a spring needed to bias the support leg 20 into a deployed state. Only one part of the assembly is movable, leg 20.

What is claimed is:

1. A leg assembly for a keyboard comprising:
   a single leg extending substantially for the length of said keyboard said single leg comprising an elongate base member attached to an elongate back member, and two side members attached to opposite ends of said base and back members;
   said elongate back member having thereon at least one rib which acts as a foot when said leg is in a retracted position and which supports a back edge of said keyboard when said leg is in a deployed position; and,
   means for axial pivotal mounting of said leg to said keyboard; wherein said leg is movable between two stable positions, a first position being said retracted position, the second position being said deployed position beyond a quiescent position of said leg, and further wherein said leg is moved from said retracted position to said deployed position solely by means of gravity and rotational inertia thereby causing said leg to pass from said retracted position, beyond said quiescent position and into said deployed position.

2. The leg assembly as claimed in claim 1 wherein said two side members have channels incorporated therein, about which said leg can pivot.

3. The leg assembly as claimed in claim 2 wherein said means for pivotally mounting is at least one pin.

4. The leg assembly as claimed in claim 3 wherein said side member is made of a resilient material, and said pin is an integral part of said keyboard, whereby said side member snaps onto said pin.

5. A leg assembly for a keyboard (10) comprising:
   a leg (20) having an elongate back member (28), an elongate base member (26), and two side members (29);
   said leg (20) extending substantially for the length of said keyboard (10) and being movable between two stable positions, a first position being a retracted position, the second position being a deployed position;
   said back member (28) having two nibs (22) located substantially towards the ends and on the same side of back member (28) such that they act as feet when leg (20) is in said retracted position and such that said nibs (22) support the back edge of said keyboard (10) when said leg (20) is in said deployed position;
   said side members (29) being made of a resilient material and having oblong channels (24) incorporated therein, about which said leg (20) can pivot;
   said leg (20) being pivotally mounted to said keyboard (10) by means of pins (12) extending through said oblong channels (24), said pins (12) being connected to struts (18) connected to base (16) of said keyboard (10);
   said keyboard (10) havig a recess (14) to accept said leg (20) when in said retracted position; and
   wherein said leg (20) is self-locking in a deployed state by means of said pins (12) interacting with said oblong channels (24) and flat edges (25) interacting with surface (30).

* * * * *